(12) United States Patent
Dosch et al.

(10) Patent No.: US 12,469,297 B2
(45) Date of Patent: Nov. 11, 2025

(54) LOW-GRAVITY SAFETY EVENT DETECTION

(71) Applicants: Kimai Dosch, Santa Clara, CA (US); Caitlin Dosch, Santa Clara, CA (US); Daron Dosch, Santa Clara, CA (US)

(72) Inventors: Kimai Dosch, Santa Clara, CA (US); Caitlin Dosch, Santa Clara, CA (US); Daron Dosch, Santa Clara, CA (US)

( * ) Notice: Subject to any disclaimer, the term of this patent is extended or adjusted under 35 U.S.C. 154(b) by 31 days.

(21) Appl. No.: 18/508,206

(22) Filed: Nov. 13, 2023

(65) Prior Publication Data

US 2025/0157220 A1 May 15, 2025

(51) Int. Cl.
 *G06V 20/52* (2022.01)
 *G06V 10/14* (2022.01)
 *G06V 10/774* (2022.01)
 *G08B 17/12* (2006.01)
 *H04N 23/23* (2023.01)

(52) U.S. Cl.
 CPC ............... *G06V 20/52* (2022.01); *G06V 10/14* (2022.01); *G06V 10/774* (2022.01); *G08B 17/125* (2013.01); *H04N 23/23* (2023.01)

(58) Field of Classification Search
 None
 See application file for complete search history.

(56) References Cited

U.S. PATENT DOCUMENTS

| | | | | |
|---|---|---|---|---|
| 5,900,942 | A * | 5/1999 | Spiering | G01J 3/2823 |
| | | | | 356/400 |
| 10,891,504 | B2 * | 1/2021 | Brauer | G06V 40/19 |
| 10,909,397 | B2 * | 2/2021 | Behr | B64D 11/0015 |
| 11,136,137 | B2 * | 10/2021 | Escobar | G06F 3/012 |
| 12,135,113 | B1 * | 11/2024 | Lerner | B60S 5/02 |
| 2006/0238741 | A1 * | 10/2006 | Ninomiya | G01J 3/44 |
| | | | | 382/106 |
| 2010/0230593 | A1 * | 9/2010 | Hill, Jr. | G01M 3/38 |
| | | | | 250/330 |
| 2010/0231722 | A1 * | 9/2010 | Hill, Jr. | G01J 3/10 |
| | | | | 348/E5.09 |
| 2011/0085030 | A1 * | 4/2011 | Poe | F23G 7/085 |
| | | | | 382/103 |
| 2016/0132532 | A1 * | 5/2016 | German | G06Q 10/063118 |
| | | | | 340/687 |
| 2019/0178717 | A1 * | 6/2019 | Redshaw | G01J 5/026 |
| 2020/0079524 | A1 * | 3/2020 | Escobar | B64D 11/0015 |
| 2021/0360201 | A1 * | 11/2021 | Hu | H04N 23/61 |
| 2021/0398289 | A1 * | 12/2021 | Schmidt | G06T 7/13 |
| 2022/0000068 | A1 * | 1/2022 | Dussau | A01K 5/0266 |
| 2022/0215744 | A1 * | 7/2022 | Ton-That | G06F 16/587 |
| 2023/0124927 | A1 * | 4/2023 | Ezra | A62C 31/28 |
| | | | | 169/61 |

(Continued)

*Primary Examiner* — Stefan Gadomski
(74) *Attorney, Agent, or Firm* — Kunzler Bean & Adamson

(57) ABSTRACT

Apparatuses, systems, methods, and computer program products for low-gravity safety event detection are described. A method includes receiving a thermal image of infrared radiation within a field of view of a thermal image sensor. A method includes processing a thermal image using a machine learning model to determine whether a safety event has occurred within a field of view. A method includes, in response to determining a safety event has occurred within a field of view, communicating to a user, on an electronic display screen of a hardware computing device, that the safety event has occurred.

18 Claims, 4 Drawing Sheets

(56) References Cited

U.S. PATENT DOCUMENTS

| | | | |
|---|---|---|---|
| 2023/0181950 A1* | 6/2023 | Bäder | A62C 37/04 |
| | | | 169/47 |
| 2023/0259769 A1* | 8/2023 | Gupta | G06N 3/045 |
| | | | 706/16 |
| 2023/0290235 A1* | 9/2023 | Nagale | G08B 7/066 |
| 2023/0298352 A1* | 9/2023 | Yun | H04N 23/45 |
| | | | 348/159 |

* cited by examiner

LOW-GRAVITY SAFETY EVENT DETECTION

FIELD

This invention relates to safety events and more particularly relates to detection of safety events such as pre-ignition combustion/fire and/or leaks in a low-gravity environment.

BACKGROUND

In low-gravity environments, such as outer space, detection of fire and/or leaks can be dangerously delayed. For example, smoke detection may rely on particles being pulled through a ventilation system. Some materials common to space travel, such as Kapton and Teflon, the two most common combustible materials on the international space station, have smoke particles so small that they are undetectable by many or all smoke detectors. Further, some fires, such as pre-ignition combustion or cool flames, may be invisible, soot-free, and/or low temperature, making traditional detection difficult or impossible. Leaks often are not discovered until after a drastic drop in oxygen levels is detected.

SUMMARY

Apparatuses for low-gravity safety event detection are presented. In one embodiment, an apparatus includes a thermal image sensor disposed within a low-gravity environment. A thermal image sensor, in some embodiments, is configured to take a thermal image of infrared radiation within a field of view of the thermal image sensor. An apparatus, in certain embodiments, includes an electronic hardware safety device in communication with a thermal image sensor. An electronic hardware safety device, in one embodiment, includes a processor and a memory storing computer program code executable by the processor to perform operations. An operation, in some embodiments, includes receiving a thermal image of infrared radiation within a field of view of a thermal image sensor. An operation, in a further embodiment, includes processing a thermal image using a machine learning model to determine whether a safety event has occurred within a field of view. An operation, in a certain embodiment, includes, in response to determining a safety event has occurred within a field of view, communicating to a user, on an electronic display screen of a hardware computing device, that the safety event has occurred.

Computer program products comprising a non-transitory computer readable storage medium storing computer program code executable to perform operations for low-gravity safety event detection are presented. In one embodiment, an operation includes receiving a thermal image of infrared radiation within a field of view of a thermal image sensor. An operation, in some embodiments, includes processing a thermal image using a machine learning model to determine whether a safety event has occurred within a field of view. An operation, in certain embodiments, includes, in response to determining a safety event has occurred within a field of view, communicating to a user, on an electronic display screen of a hardware computing device, that the safety event has occurred.

Methods for low-gravity safety event detection are presented. A method, in one embodiment, includes receiving a thermal image of infrared radiation within a field of view of a thermal image sensor. In a further embodiment, a method includes processing a thermal image using a machine learning model to determine whether a safety event has occurred within a field of view. A method, in some embodiments, includes, in response to determining a safety event has occurred within a field of view, communicating to a user, on an electronic display screen of a hardware computing device, that the safety event has occurred.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Aspects of the present invention are described herein with reference to system diagrams, flowchart illustrations, and/or block diagrams of methods, apparatuses, systems, and computer program products according to embodiments of the invention. It will be understood that blocks of the flowchart illustrations and/or block diagrams, and combinations of blocks in the flowchart illustrations and/or block diagrams, can be implemented by computer readable program instructions.

Figure 1:
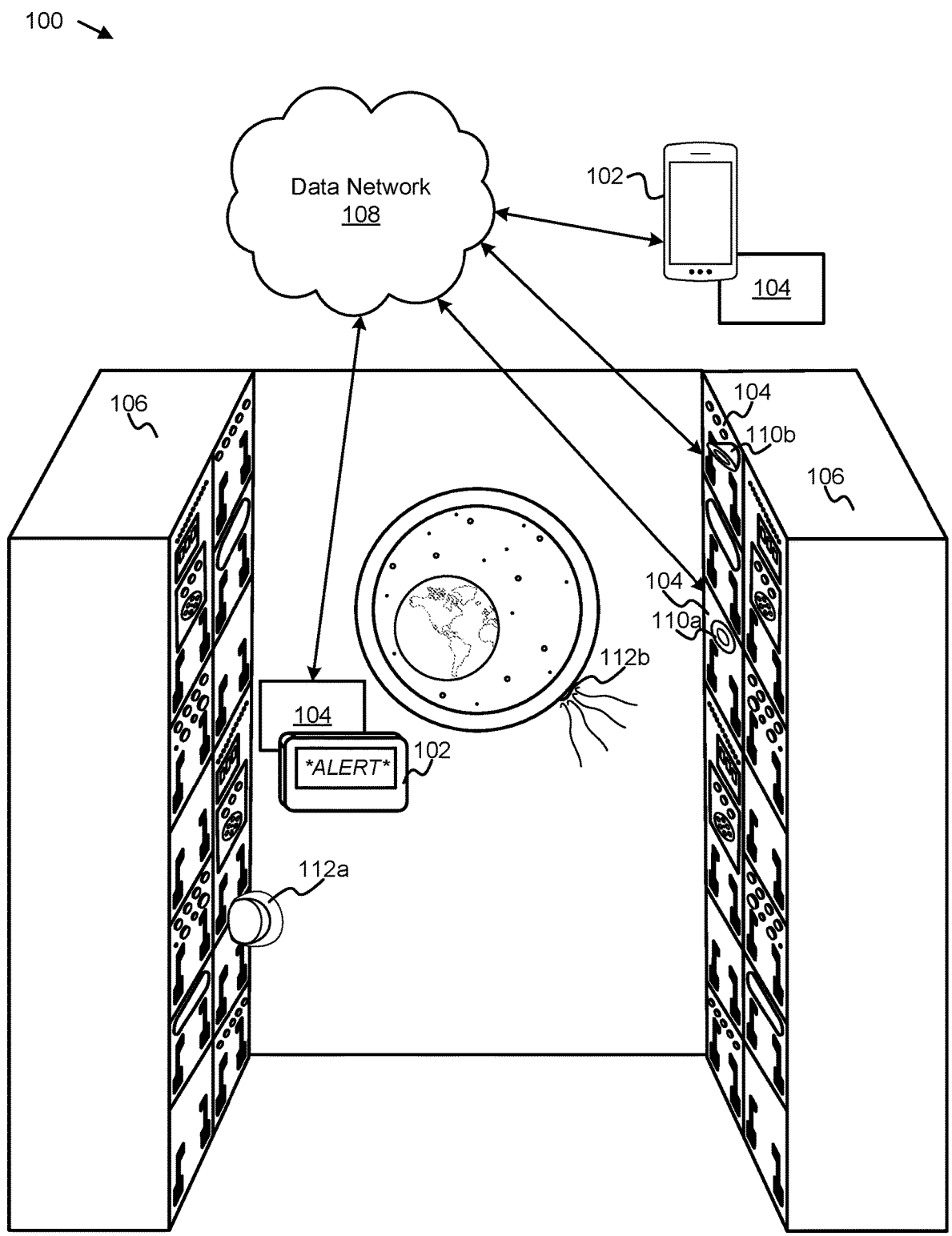
FIG. 1 is a perspective view illustrating one embodiment of a system for low-gravity safety event detection.

FIG. 1 depicts one embodiment of a system 100 for low-gravity safety event detection. The system 100, in the depicted embodiment, includes one or more hardware computing devices 102, one or more electronic hardware safety devices 104, one or more equipment racks 106, a data network 108, one or more thermal image sensors 110, and one or more safety events 112a-b.

In general, a hardware safety device 104 is configured to process one or more thermal images (e.g., still images, videos, or the like) from a thermal image sensor 110 using machine learning to determine whether a safety event 112 has occurred within a field of view of the thermal image sensor 110, and to communicate the safety event 112 to a user on a hardware computing device 102 in response to determining the safety event 112 has occurred.

The system 100, in some embodiments, includes and/or is disposed in a low-gravity environment, such as a zero-gravity environment, space, outer space, or the like. For example, the system 100 may be disposed in a space station, a rocket, a shuttle, and/or another space or low-gravity vehicle. The system 100 may be disposed far enough away from the Earth and/or another celestial body to reduce and/or eliminate an effect of gravity on the system 100. For example, the system 100 may be disposed beyond the Kármán line (e.g., 100 km or 62 mi above the Earth's sea level).

Since natural convection is absent in space, in some systems, smoke detectors may be placed in the ventilation system, where forced convection may push smoke toward them. In such a system, astronauts may not find out about a fire until smoke reaches the ventilation system. A delay in detecting a fire may be dangerous or even deadly, not only because of the time delay but because the ventilation system may also spread the fire. Often, before an astronaut can put out a fire, they must manually turn off the ventilation system.

Some materials such as Kapton and Teflon, two of the most common combustible materials in low-gravity vehicles, cannot be detected by most photoelectric and ionization smoke detectors because their smoke particles are too small. Kapton and Teflon are commonly used in electronics as well, making them even more likely to be subject to high heat or to combust. Cool flames, a type of fire that exists in low or zero gravity, can be invisible to the human eye. Cool flames may be soot-free, low temperature, and may burn undetected by some smoke detectors.

Instead of relying only on smoke detectors, in some embodiments, an electronic hardware safety device 104 processes images (e.g., still images, video, video frames, or the like) from a thermal image sensor 110 using a machine learning model to detect one or more safety events 112 such as a fire 112a (e.g., pre-ignition combustion, a cool flame invisible to the human eye, and/or another fire) and/or a leak 112b (e.g., between outer space and an interior of a space craft or other vehicle in a low-gravity environment), or the like. For example, in certain embodiments, an electronic hardware safety device 104 may comprise one or more machine learning models (e.g., for image recognition and/or classification, object/event detection, or the like) trained on images (e.g., still images, video, video frames, or the like) of one or more safety events 112. For example, an electronic hardware safety device 104 may use a convolutional neural network, a deep learning model, a single-label classification model, a multi-label classification model, an image segmentation model, an object detection model, a support vector machine model, a scale-invariant feature transform model, a maximally stable extremal regions model, a speeded-up robust features model, a histogram of oriented gradients model, a rule-based classification model, a region-based convolutional neural network, a region proposal network model, a single shot detector model, a K-means clustering model, an iterative self-organizing data analysis technique model, a maximum likelihood model, a minimum distance model, a residual network model, and/or another machine learning model configured to process optical data from a thermal image sensor 110 to identify a safety event 112, or the like.

An electronic hardware safety device 104 may communicate a safety event 112 such as a fire 112a and/or a leak 112b to a user via a hardware computing device 102 (e.g., as an alert and/or other graphical display on an electronic display screen of a hardware computer device 102; as an audible alert, siren, and/or other sound from an electronic speaker of a hardware computer device 102; as a push notification, text message, email, and/or other message sent over a data network 108; or the like). An electronic hardware safety device 104, in certain embodiments, may automatically initiate a fire suppression system in response to determining a safety event 112 has occurred (e.g., in response to detecting a fire 112a, in response to a user failing to verify a fire 112a within a predefined time period, or the like).

In some embodiments, an electronic hardware safety device 104 may predict a fire or other combustion before it occurs by identifying higher than normal temperature concentrations (e.g., a temperature in an identified area within a field of view of a thermal image sensor 110 being higher than a first temperature threshold, or the like). Conversely, in certain embodiments, an electronic hardware safety device 104 may detect and/or predict a leak by determining that a temperature in an identified area within a field of view of a thermal image sensor 110 is lower than a second temperature threshold, or the like.

In one embodiment, an electronic hardware safety device 104 and/or a thermal image sensor 110 may be rack-mountable (e.g., configured to be disposed on or otherwise installed in an equipment rack 106 and/or another rack mounting system, such as an International Payload Standard Rack, or the like). A thermal image sensor 110b, in some embodiments, may be disposed on an equipment rack 106 such that the equipment rack 106 is at least partially within a field of view of the thermal image sensor 110b (e.g., to detect and/or predict fires 112a on equipment coupled to the rack 106, on material stored in the rack 106, or the like). In a further embodiment, a thermal image sensor 110a may be disposed on a first equipment rack 106 such that a second equipment rack 106 is at least partially within a field of view of the thermal image sensor 110a (e.g., to detect and/or predict fires 112a on equipment coupled to the second rack 106, on material stored in the second rack 106, or the like). In one embodiment, a thermal image sensor 110 may be disposed within a drawer or other compartment of an equipment rack 106 (e.g., to detect fires 112a occurring the drawer or other compartment, or the like). A thermal image sensor 110, in other embodiments, may be disposed such that a wall (e.g., an interior face of an exterior wall, or the like) is disposed at least partially within a field of view of the thermal image sensor 110 (e.g., in order to detect leaks 112b, or the like).

In order to predict and/or detect multiple types of safety events 112, in some embodiments, an electronic hardware safety device 104 may comprise a machine learning model trained on images with multiple thermal lock spans (e.g., an image of a fire 112a and/or pre-combustion heating 112a with a higher thermal lock span, an image of a leak 112b with a lower thermal lock span, or the like). A thermal lock span may comprise a temperature range represented in an image. For example, an electronic hardware safety device 104 may alternate settings for a thermal image sensor 110, taking and processing images with a higher thermal lock span to detect fires 112a, and alternatively taking and processing images with a lower thermal lock span to detect leaks 112b. In some embodiments, an electronic hardware safety device 104 may use different thermal lock spans for different thermal image sensors 110 (e.g., using a lower thermal lock span for a thermal image sensor 110 aimed at a wall to detect leaks 112b, using a higher thermal lock span for a thermal image sensor 110 aimed at an equipment rack 106 to detect fires 112a, or the like).

For example, an electronic hardware safety device 104 may receive a first image having a higher temperature thermal lock span and may process the first image to detect and/or predict a fire 112a, and may receive a second image having a lower temperature thermal lock span and may process the second image to detect and/or predict a leak 112b, or the like. Using different thermal lock spans to detect and/or predict fires 112a and leaks 112b, in some embodiments, may allow more fine-grained temperature and/or safety event 112 detection than using a single thermal lock span for both (e.g., the color gradients in the images may be more detailed, as the thermal lock span is smaller and more focused on the temperature ranges to be detected).

An electronic hardware safety device 104 may process images (e.g., still images, video, or the like) from a thermal image sensor 110 using one or more machine learning models to classify the images (e.g., extreme heat indicating a fire 112a, no extreme heat, extreme cold indicating a leak 112b, no extreme cold, or the like). An electronic hardware safety device 104, in some embodiments, may determine a confidence metric for a classification. For classifications with confidence levels below a threshold, in some embodiments, an electronic hardware safety device 104 may send an associated image to a user (e.g., mission control, an astronaut, an administrator, or the like) to confirm, and may add the image to a training dataset to improve an accuracy of the machine learning model in response to the user confirming that the image is of a safety event 112, or the like. For classifications with confidence levels above a threshold, an electronic hardware safety device 104 may communicate the safety event 112 to a user as described above.

In one embodiment, one or more thermal image sensors 110 may be configured to take thermal images (e.g., still images, video, video frames, or the like) of infrared radiation with a field of view. For example, a thermal image sensor 110 may render infrared radiation as visible light, where different locations with a similar temperature have the same color, or the like.

A hardware safety device 104 may be configured to perform a predefined action in response to detecting a safety event 112, such as communicating the safety event 112 to a user, initiating a fire suppression system, or the like.

In some embodiments, a hardware safety device 104 may comprise logic hardware such as one or more of a processor (e.g., a CPU, a controller, a microcontroller, firmware, microcode, an application specific integrated circuit (ASIC), a field programmable gate array (FPGA) or other programmable logic, or the like), a volatile memory, a non-volatile computer readable storage medium, a network interface, a printed circuit board, or the like. A hardware safety device 104, in further embodiments, may include computer program code stored on a non-transitory computer readable storage medium (e.g., of a thermal image sensor 110 and/or of a hardware computing device 102), executable by a processor to perform one or more of the operations described herein, or the like.

A hardware safety device 104, in certain embodiments, may receive one or more commands, user input, or the like from a hardware computing device 102 (e.g., from a control panel, from a mobile device, from a command center, over a data network 108, or the like), may send one or more notifications, messages, alerts or the like to a hardware computing device 102 over a data network 108, and/or otherwise be in communication with a hardware computing device 102 (e.g., a control panel, a server computing device, a computer of a command center, a mobile computing device such as a smartphone, a smart watch, a tablet, a laptop, or the like, a desktop computer, and/or another hardware computing device 102 comprising a processor and a memory).

The data network 108, in one embodiment, includes a digital communication network that transmits digital communications. The data network 108 may include a hardwired network, a serial bus, a wireless network, such as a wireless cellular network, a local wireless network, such as a Wi-Fi network, a Bluetooth® network, a near-field communication (NFC) network, an ad hoc network, or the like. The data network 108 may include a wide area network (WAN), a local area network (LAN), an optical fiber network, the internet, or other digital communication network. The data network 108 may include a combination of two or more networks. The data network 108 may include one or more servers, routers, switches, and/or other networking equipment.

One or more electronic hardware safety devices 104, hardware computing devices 102, and/or thermal image sensors 110 may be in communication over a data network 108, either directly or through a backend server computing device, or the like. A hardware safety device 104 executing on a hardware computing device 102 (e.g., computer executable program code, an installable application, a mobile application, or the like), in some embodiments, may provide a user interface to notify a user and/or for a user to perform one or more actions and/or selections described herein.

Figure 2:
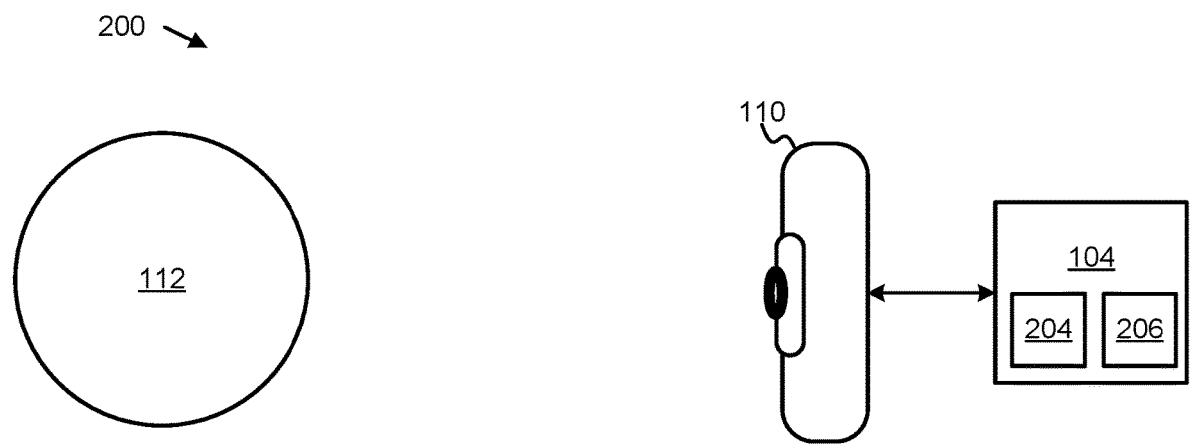
FIG. 2 is a schematic block diagram illustrating a further embodiment of a system for low-gravity safety event detection.

FIG. 2 depicts one embodiment of a system 200 for low-gravity safety event detection. The electronic hardware safety device 104, the thermal image sensor 110, and/or the safety event 112 of FIG. 2, in some embodiments, may be substantially similar to the electronic hardware safety device 104, the thermal image sensor 110, and/or the safety event 112 described above with regard to FIG. 1. In the depicted embodiment, the electronic hardware safety device 104 includes a processor 204 and a memory 206.

In some embodiments, an electronic hardware safety device 104 may comprise computer program code stored in a memory 206 and executable by a processor 204 to perform one or more of the operations described herein with regard to a hardware safety device 104. For example, a processor 204 may comprise a CPU, a controller, a microcontroller, firmware, microcode, an ASIC, an FPGA or other programmable logic, or the like and a memory 206 may comprise a volatile memory, a non-transitory computer readable storage medium, or the like in communication with the processor 204. As described above with regard to FIG. 1, in some embodiments, an electronic hardware safety device 104 may comprise a hardware computing device configured to be removably installed in an equipment rack 106, or the like, and in communication with one or more thermal image sensors 110.

Figure 3:
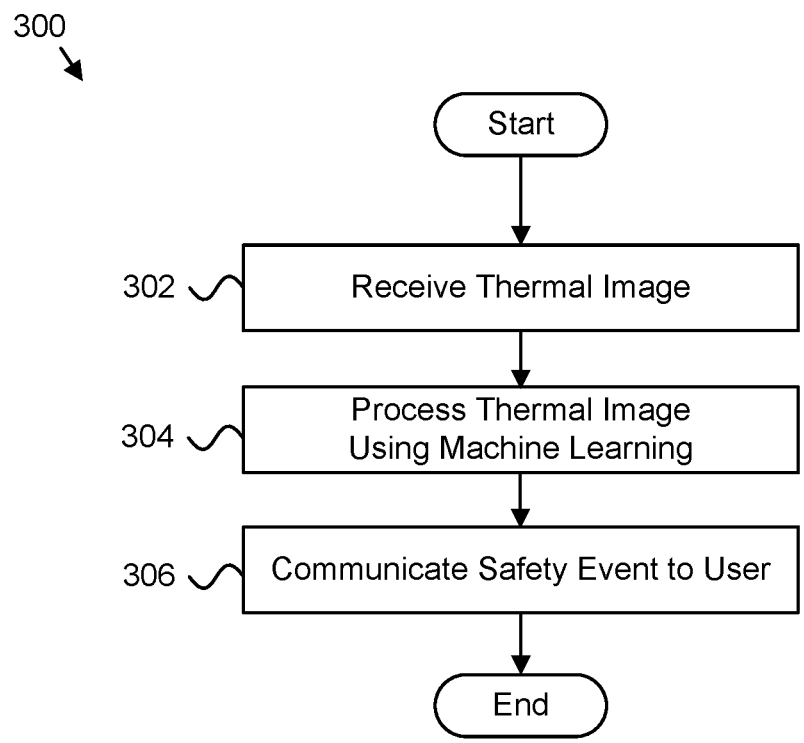
FIG. 3 is a schematic flow chart diagram illustrating one embodiment of a method for low-gravity safety event detection.

FIG. 3 depicts one embodiment of a method 300 for low-gravity safety event detection. The method 300 begins and an electronic hardware safety device 104 receives 302 a thermal image of infrared radiation within a field of view of a thermal image sensor 110. An electronic hardware safety device 104 processes 304 the thermal image using a machine learning model to determine whether a safety event 112 has occurred within the field of view. An electronic hardware safety device 104, in response to determining the safety event 112 has occurred within the field of view, communicates 306 to a user, on an electronic display screen of a hardware computing device 102, that the safety event has occurred and the method 300 ends.

Figure 4:
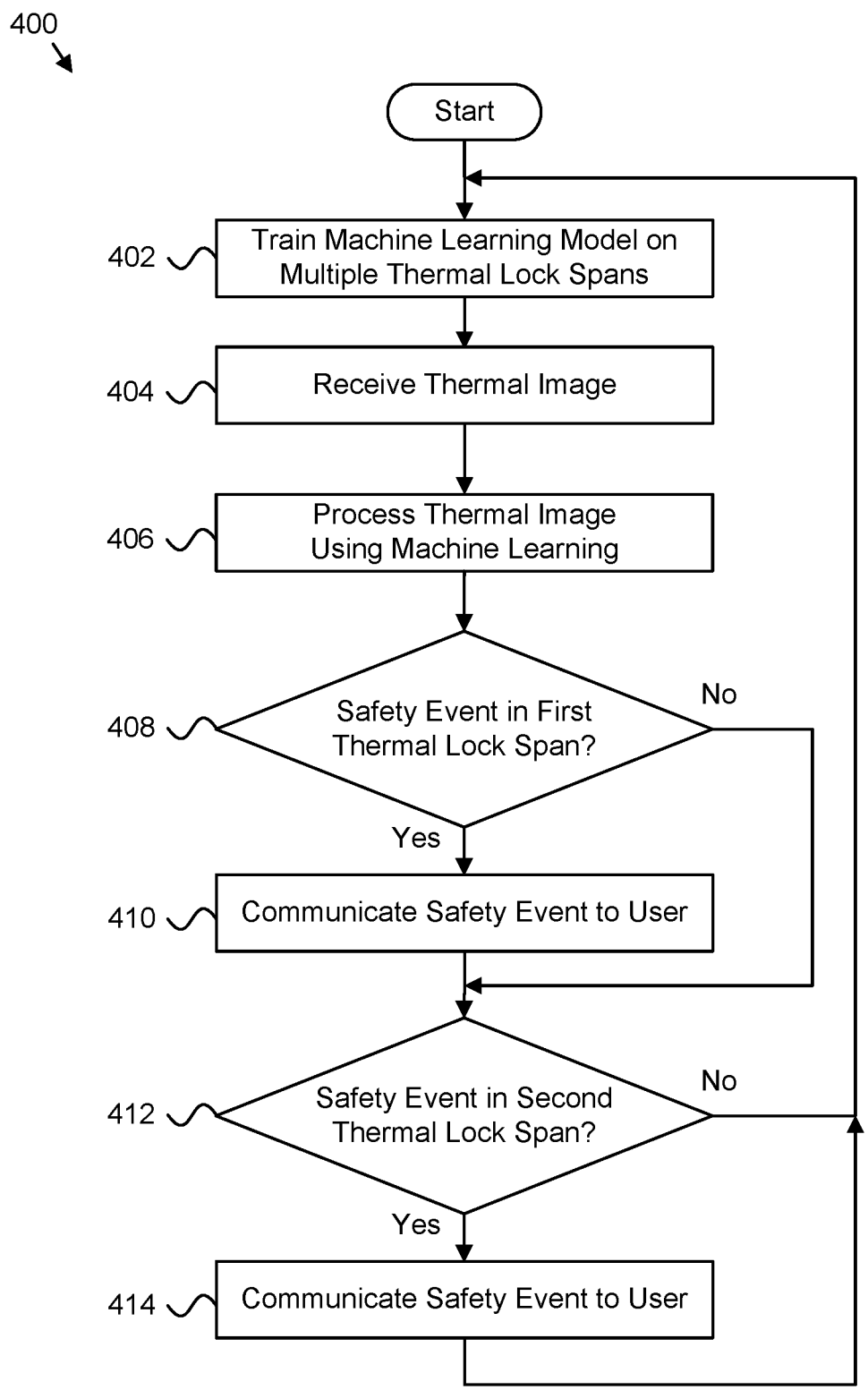
FIG. 4 is a schematic flow chart diagram illustrating a further embodiment of a method for low-gravity safety event detection.

FIG. 4 depicts one embodiment of a method 400 for low-gravity safety event detection. The method 400 begins and an electronic hardware safety device 104 trains 402 a machine learning model using images with multiple different thermal lock spans. An electronic hardware safety device 104 receives 404 a thermal image of infrared radiation within a field of view of a thermal image sensor 110.

An electronic hardware safety device 104 processes 406 the thermal image using the machine learning model to determine 408 whether a safety event 112 has occurred within a first thermal lock span. If the electronic hardware safety device 104 determines 408 that the safety event 112 occurred within the first thermal lock span, the electronic hardware safety device 104 communicates 410 to a user that the safety event 112 has occurred. An electronic hardware safety device 104 determines 412 whether a safety event has occurred within a second thermal lock span. If the electronic hardware safety device 104 determines 412 that the safety event 112 occurred within the second thermal lock span, the electronic hardware safety device 104 communicates 414 to a user that the safety event 112 has occurred. The method 400 continues, retraining 402 the machine learning model and receiving 404 and processing 406 additional thermal images.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments. These features and advantages of the embodiments will become more fully apparent from the following description and appended claims or may be learned by the practice of embodiments as set forth hereinafter.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules to emphasize their implementation independence more particularly. For example, a module may be implemented as a hardware circuit comprising custom very large scale integrated ("VLSI") circuits or gate arrays, off-the-shelf semiconductor circuits such as logic chips, transistors, or other discrete components. A module may also be implemented in programmable hardware devices such as an FPGA, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a server, cloud storage (which may include one or more services in the same or separate locations), a hard disk, a solid state drive ("SSD"), an SD card, a random access memory ("RAM"), a read-only memory ("ROM"), an erasable programmable read-only memory ("EPROM" or Flash memory), a static random access memory ("SRAM"), a Blu-ray disk, a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, a personal area network, a wireless mesh network, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages.

The computer readable program instructions may execute entirely on the user's computer, partly on the user's computer, as a stand-alone software package, partly on the user's computer and partly on a remote computer or service or entirely on the remote computer or server or set of servers. In the latter scenario, the remote computer may be connected to the user's computer through any type of network, including the network types previously listed. Alternatively, the connection may be made to an external computer (for example, through the Internet using an Internet Service Provider). In some embodiments, electronic circuitry including, for example, programmable logic circuitry, FPGA, or programmable logic arrays ("PLA") may execute the computer readable program instructions by utilizing state information of the computer readable program instructions to personalize the electronic circuitry to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical functions.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Means for performing the steps described herein, in various embodiments, may include one or more of a network interface, a controller (e.g., a CPU, a processor core, an FPGA or other programmable logic, an ASIC, a microcontroller, and/or another semiconductor integrated circuit device), a hardware appliance or other hardware device, other logic hardware, and/or other executable code stored on a computer readable storage medium. Other embodiments may include similar or equivalent means for performing the steps described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a thermal image sensor disposed within a low-gravity environment, the thermal image sensor configured to take a thermal image of infrared radiation within a field of view of the thermal image sensor;
an electronic hardware safety device in communication with the thermal image sensor, the electronic hardware safety device comprising a processor and a memory, the memory storing computer program code executable by the processor to perform operations, the operations comprising:

training a machine learning model using images with multiple different thermal lock spans;

receiving the thermal image of the infrared radiation within the field of view of the thermal image sensor;

processing the thermal image using the machine learning model to determine whether a safety event has occurred within the field of view;

receiving a second thermal image having a lower temperature thermal lock span than the thermal image;

processing the second thermal image using the machine learning model to determine whether a second safety event has occurred within the field of view, the safety event comprising one or more of pre-ignition combustion and a fire and the second safety event comprising a leak; and in response to determining the safety event has occurred within the field of view, communicating to a user, on an electronic display screen of a hardware computing device, that the safety event has occurred.

2. The apparatus of claim 1, wherein the safety event comprises one or more of a pre-ignition combustion and a fire.

3. The apparatus of claim 2, the operations further comprising automatically initiating a fire suppression system in response to determining the safety event has occurred.

4. The apparatus of claim 2, wherein the one or more of the pre-ignition combustion and the fire comprises a cool flame invisible to the human eye.

5. The apparatus of claim 1, wherein the safety event comprises a leak.

6. The apparatus of claim 5, wherein the leak comprises a leak between outer space and an interior of a space craft in the low-gravity environment.

7. The apparatus of claim 1, wherein the thermal image sensor is disposed such that the field of view is directed toward an equipment rack.

8. The apparatus of claim 1, wherein the low gravity environment comprises a zero-gravity environment.

9. The apparatus of claim 8, wherein the zero-gravity environment comprises outer space.

10. A computer program product comprising a non-transitory computer readable storage medium storing computer program code executable by a processor to perform operations, the operations comprising:

training a machine learning model using images with multiple different thermal lock spans;

receiving the thermal image of the infrared radiation within the field of view of the thermal image sensor;

processing the thermal image using the machine learning model to determine whether a safety event has occurred within the field of view;

receiving a second thermal image having a lower temperature thermal lock span than the thermal image;

processing the second thermal image using the machine learning model to determine whether a second safety event has occurred within the field of view, the safety event comprising one or more of pre-ignition combustion and a fire and the second safety event comprising a leak; and in response to determining the safety event has occurred within the field of view, communicating to a user, on an electronic display screen of a hardware computing device, that the safety event has occurred.

11. The computer program product of claim 10, wherein the safety event comprises one or more of a pre-ignition combustion and a fire.

12. The computer program product of claim 11, the operations further comprising automatically initiating a fire suppression system in response to determining the safety event has occurred.

13. The computer program product of claim 11, wherein the one or more of the pre-ignition combustion and the fire comprises a cool flame invisible to the human eye.

14. The computer program product of claim 10, wherein the safety event comprises a leak.

15. The computer program product of claim 14, wherein the leak comprises a leak between outer space and an interior of a space craft in the low-gravity environment.

16. The computer program product of claim 10, wherein the thermal image sensor is disposed such that the field of view is directed toward an equipment rack.

17. The computer program product of claim 10, wherein the low gravity environment comprises a zero-gravity outer space environment.

18. A method comprising:

training a machine learning model using images with multiple different thermal lock spans;

receiving the thermal image of the infrared radiation within the field of view of the thermal image sensor;

processing the thermal image using the machine learning model to determine whether a safety event has occurred within the field of view;

receiving a second thermal image having a lower temperature thermal lock span than the thermal image;

processing the second thermal image using the machine learning model to determine whether a second safety event has occurred within the field of view, the safety event comprising one or more of pre-ignition combustion and a fire and the second safety event comprising a leak; and in response to determining the safety event has occurred within the field of view, communicating to a user, on an electronic display screen of a hardware computing device, that the safety event has occurred.

* * * * *